Aug. 25, 1931.　　　A. AGRAMONTE　　　1,820,108
VEHICLE RUNNING GEAR
Filed Oct. 26, 1929　　　3 Sheets-Sheet 1

Inventor
ALBERT AGRAMONTE
By
Herbert T. Davis
Attorney

Aug. 25, 1931.  A. AGRAMONTE  1,820,108
VEHICLE RUNNING GEAR
Filed Oct. 26, 1929  3 Sheets-Sheet 2
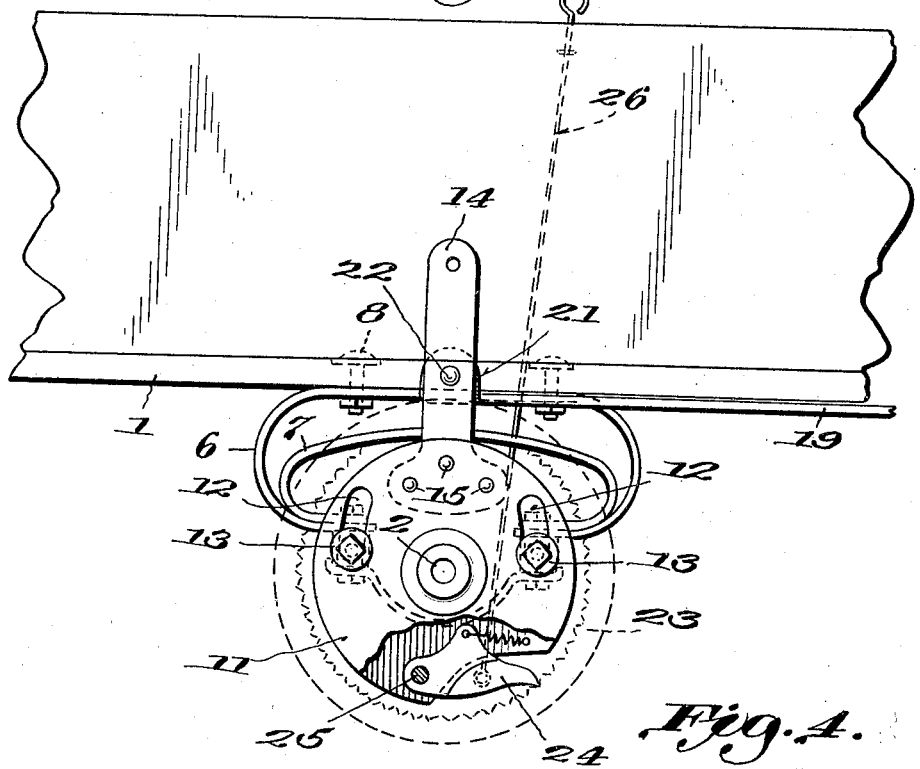
Fig. 3.
Fig. 4.
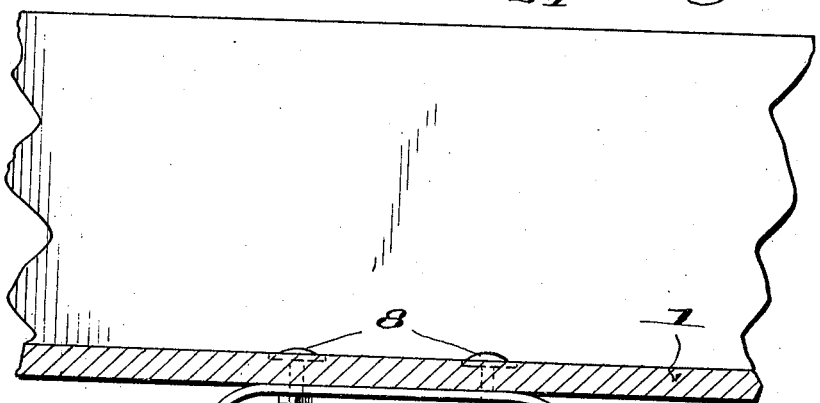
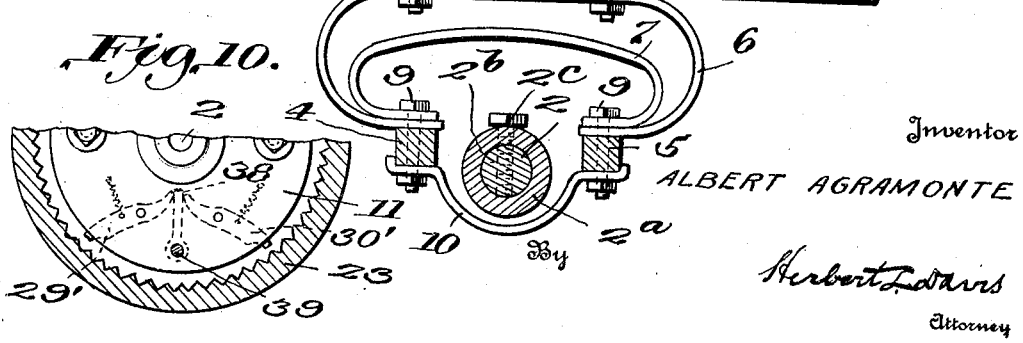
Fig. 10.
Inventor
ALBERT AGRAMONTE
By Herbert L. Davis
Attorney Aug. 25, 1931.  A. AGRAMONTE  1,820,108
VEHICLE RUNNING GEAR
Filed Oct. 26, 1929  3 Sheets-Sheet 3
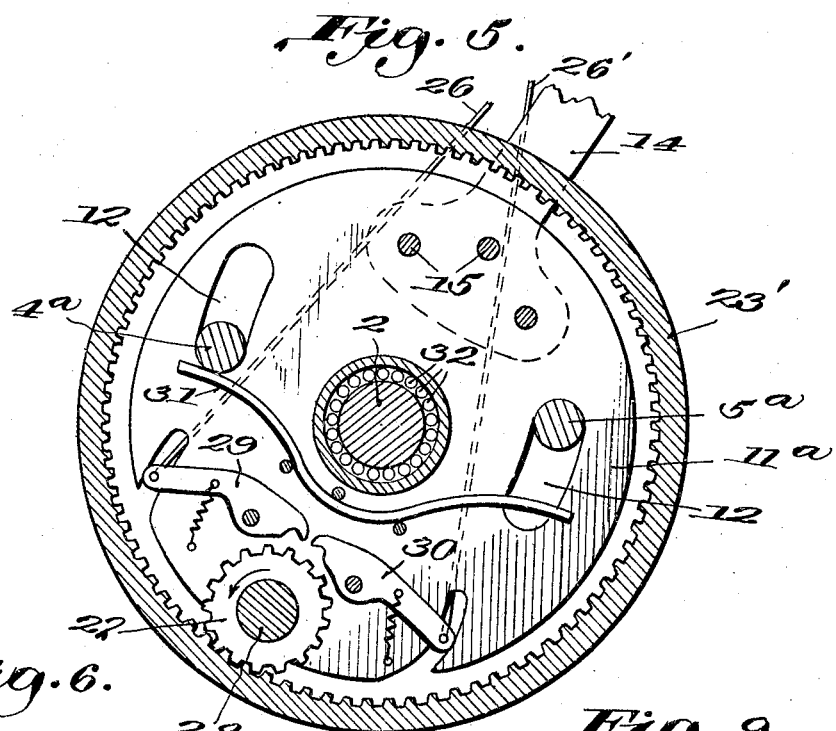
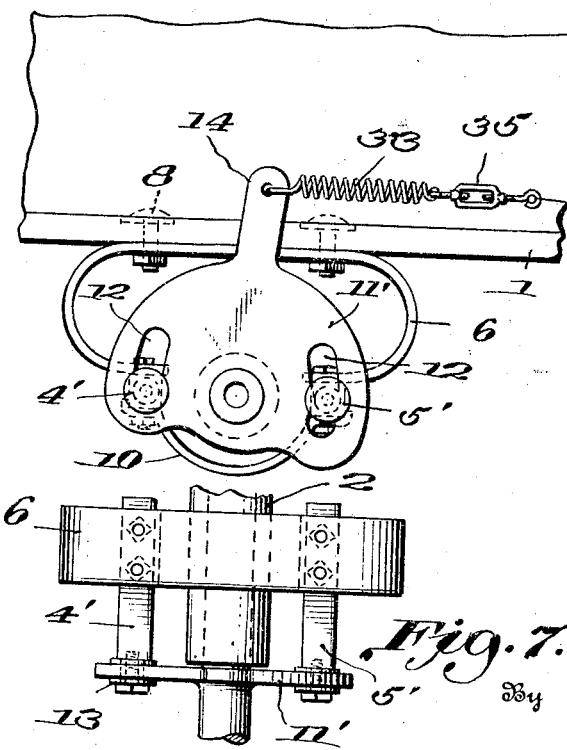
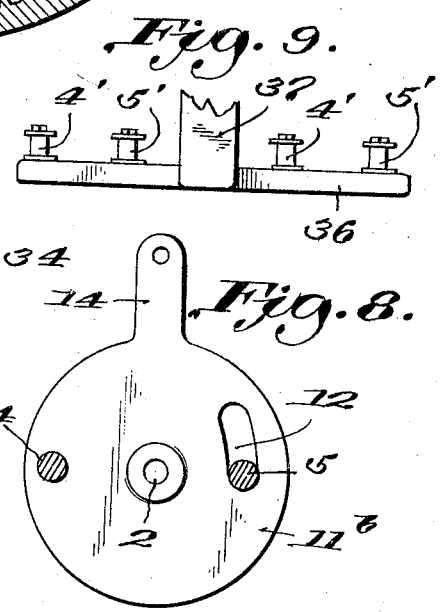
Inventor
ALBERT AGRAMONTE
By Herbert L. Davis
Attorney Patented Aug. 25, 1931

1,820,108

UNITED STATES PATENT OFFICE

ALBERT AGRAMONTE, OF CAMAGUEY, CUBA

VEHICLE RUNNING GEAR

Application filed October 26, 1929. Serial No. 402,650.

This invention relates to improvements in the running gear or load suspension system for vehicles, and in certain of its aspects may be regarded as an improvement on and further development of my prior Patent, No. 1,712,063, dated May 7, 1929.

In said prior patent, I disclosed a load supporting plate tiltable about an axis disposed immediately below the vehicle axle, for the purpose of throwing the weight against a flange carried by the wheel to assist in starting and turning the same.

In the present invention, I provide one or more load supporting plates which are pivotally mounted on and tiltable about the main axle of the vehicle, the load being transmitted to such plates by means of one or more auxiliary axles which directly carry the weight.

The plates may be tilted or shifted either by the inertia of the load itself when draft is applied to the frame of the vehicle to move the same or by the pull or tractive effort exerted on a drawbar or the like.

The present invention also contemplates the provision of an internally toothed ratchet drum secured to the wheel, and a pawl pivoted to the tiltable plate and adapted to engage such ratchet drum. This has the effect of enabling the weight of the load to assist in turning the wheel to start the vehicle when tractive effort is applied and the plate thus caused to tilt. Furthermore, when such pawl and ratchet mechanism is applied to both wheels of a two wheel vehicle such as a cart or the like, it serves to prevent the vehicle from rolling backwards, and also serves to enable the cart to make short turns and easily pull out of a hole or the like by locking one wheel and thus causing it to act as a pivot about which the other wheel may roll.

I also contemplate applying the present invention to power driven axles, to freely turning wheels, and to railway rolling stock axles and to ordinary road vehicles.

In order that the invention may be readily understood, reference is had to the accompanying drawings, forming part of this specification, and in which:—

Figure 3 is an enlarged fragmentary side elevation of a portion of the cart frame showing one of my improved tilting plates and associated parts, certain parts being broken away for the sake of clearness;

Figure 4 is a fragmentary enlarged sectional view similar to Figure 2, showing the main and auxiliary axles and the supporting springs;

Figure 5 is a still further enlarged sectional elevation of the driving gear of a power propelled vehicle showing how my improved tilting plate can be applied thereto;

Figure 6 is a fragmentary side elevation quite similar to Figure 3, but showing a modified construction;

Figure 7 is a plan view thereof, the body or frame being omitted;

Figure 8 is a side elevation of one of my tilting plates as applied to a vehicle which is movable in one direction only;

Figure 9 is a fragmentary plan view of a portion of railroad car truck frame showing how my invention can be applied thereto; and Figure 10 is a fragmentary sectional portion of Figure 3, but showing a construction adapted for use in connection with railway cars.

Figure 1:
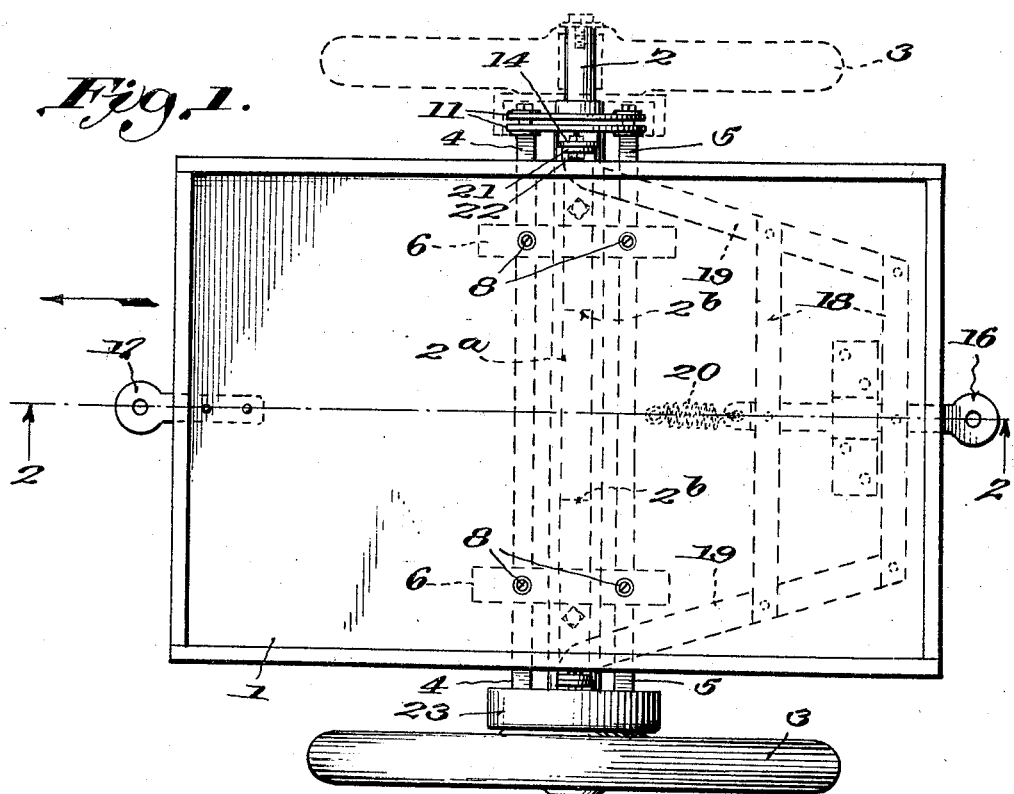
Figure 1 is a plan view of a two wheel cart showing one form of my invention applied thereto.

With reference to the drawings, it is readily understood that the relative ratio of the diameter of the wheel 3 and of the ratchet drum 23 has been exaggerated in the various figures for the sake of clearness and that ordinarily the ratchet drum will be relatively much smaller and the rocking system will move through much smaller angles past either side of the vertical.

Referring to the drawings in detail, 1 designates the body or other superstructure of a two wheeled cart or the like, which body I shall hereinafter refer to as the frame. The cart is provided with a main axle 2 on which are mounted a pair of supporting wheels 3.

While the main axle may be of the usual or any desired construction, I have shown it as comprising a tubular outer portion $2^a$ having spindles $2^b$ secured in each end thereof and fastened by screws $2^c$ (see Figures 1 and 4).

Figure 2:
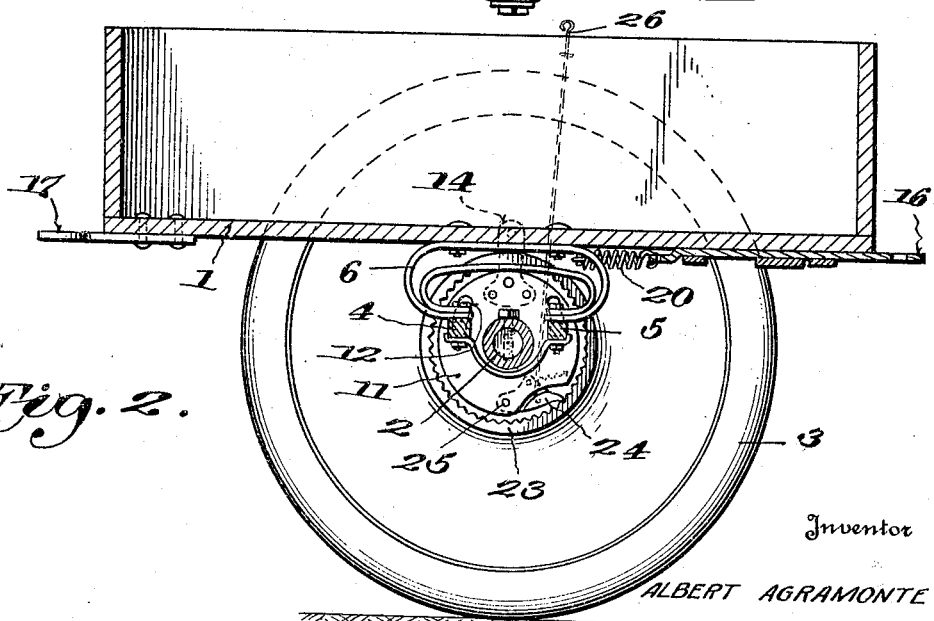
Figure 2 is a vertical longitudinal section substantially on the line 2—2 of Figure 1.

On each side of the main axle 2 and extending parallel therewith at a short distance therefrom are a pair of auxiliary axles 4 and 5, shown in Figures 2 and 4, as square in cross section. To these auxiliary axles are rigidly secured, as by means of bolts 9, the lower side of the load supporting springs 6, 7, on the upper side of which the frame 1 rests and is secured to the member 6 as by means of bolts 8. The auxiliary axles are braced and held in the proper spaced relation by means of yokes 10, the ends of which are secured by the bolts 9, as clearly shown in Figure 4. The yokes 10 are sufficiently resilient to withstand and partially absorb shocks resulting from the axle 2 suddenly dropping when one of the wheels falls into a rut or depression. They are likewise sufficiently rigid to maintain the auxiliary axles 4 and 5 in a substantially fixed relation as to each other. Consequently, any tendency of the auxiliary axles 4 and 5 to rise in their respective slots 12 upon such occurrences is immediately opposed by the members 10.

My improved tilting plates are indicated at 11. In some cases, as for example, as shown at the upper side of Figure 1, each tilting plate unit comprises a pair of plates rigidly connected in spaced parallel relation. In other cases, as shown, for example, in Figures 6 and 7, each unit comprises but a single plate. It is convenient to employ the double plate construction where, as illustrated in Figure 3, a pivoted pawl is employed, since such pawl can be conveniently mounted between the pair of plates.

It will be understood that the plate or plates 11 at each side of the vehicle are pivotally mounted on the main axle 2 and are capable of rocking or tilting about the same. These plates are each provided with a pair of opposed arcuate slots 12 disposed on opposite sides of the main axle 2, each slot lying on an arc struck from a point in the opposite slot as a center.

As best illustrated in Figure 5, the extreme ends of the auxiliary axles 4 and 5 are made cylindrical, and are so constructed as to extend through and work freely in the slots 12. Cap nuts 13 or the like are screwed onto the ends $4^a$ and $5^a$ of the auxiliary axles outside of the plates 11, so as to hold such plates in position. This construction makes a more flexible device and avoids a rigid connection between the auxiliary axles 4 and 5 and the main axle 11.

To the tilting plate 11 at each side of the vehicle is rigidly secured a radially extending arm 14, as by bolts or rivets 15. As an alternative construction, and as shown in Figures 6 and 8, this arm may be formed integral with the plate.

As illustrated in Figures 1 and 2, the cart shown is in the nature of a trailer and a plurality of such carts are adapted to be connected to form a train by means of couplings or drawbars 16 and 17. The drawbar 17 is rigidly secured to the frame of the cart but the drawbar 16 forms part of an independent frame comprising cross members 18 and side members 19 which is mounted to slide underneath the frame of the cart and is normally held in the position shown in the drawings by means of a helical spring 20 connecting the sliding frame with the cart frame. The extreme ends of the side members 19 are turned up as at 21 (see Figure 3), and are pivotally secured to the arms 14 as by means of bolts 22.

Thus, when tractive effort is applied to the drawbar 17, and a pull is exerted on the drawbar 16 by the car behind, the frame 18, 19 will slide rearwardly relative to the cart frame and will thus rock or tilt the plates 11, thereby causing the forward slots 12 to engage the ends of the auxiliary axle 4, thereby applying the weight of the load at a point in advance of the main axle and facilitating starting. In stopping, the reverse action takes place, namely, the slidable frame 18, 19 is moved in the opposite direction, thus causing the load to bear on the tilting plates through the auxiliary axle 5, at a point at the rear of the main axle and hence tending to brake the vehicle.

In the form of invention shown in Figures 1, 2 and 3, the supporting wheel of the vehicle adjacent each plate 11 is provided with a centrally disposed internally toothed ratchet drum 23, and a pawl 24 pivoted to the plate or plates 11, at 25, is adapted to engage the teeth on the inside of such drum. This pawl is spring pressed into engagement with the drum, and is so shaped as to permit movement of the drum in one direction only. Thus, in going up hill, the vehicle is prevented from running backward. Furthermore, if one wheel encounters an obstacle, or drops into a hole or depression, it is possible, in the case of a two-wheeled cart drawn by a draft animal, to cause the wheel to ride over the obstacle or to climb out of the hole or depression by turning the cart sharply to one side, the other wheel becoming automatically locked by the pawl 24 and serving as a pivot about which the vehicle may swing. Suitable manual means, shown in Figure 3 as a pull rod 26, is provided by releasing the pawl 24 when desired.

In Figure 5, I have shown my improved tilting plate as applied to a power driven vehicle. In this figure, the plate is somewhat modified in construction and is designated as $11^a$. It fits within and is surrounded by an internally toothed ring gear 23', which is secured to the vehicle wheel (not shown). A driving pinion 27, carried by a power driven shaft 28, meshes with this ring gear. In this figure, the tilting plate is provided with the arcuate slots 12, as before, and the ends 4ª and 5ª of the auxiliary axles work through these slots. Pawls 29 and 30 are pivotally mounted on the plate and are adapted to engage the pinion 27, each pawl, when engaged, permitting rotation of the pinion in one direction only. Manual means such as rods 26 and 26' are provided for controlling the position of these pawls, as desired.

While in the preceding figures, the pawls are shown as directly engaging the teeth of the drum and in Figure 5, they are shown as engaging the teeth of the pinion which meshes with the toothed drum, it will be seen that in both cases these pawls serve to govern or control the rotation of the drum relative to the tilting plate. In Figure 5, the same action as regards applying the weight of the load to the tilting plates through the medium of auxiliary axles and arcuate slots 12 takes place as above described, in connection with the other figures, and, the proper one of the pawls 29 and 30 being in engagement with the pinion 27, the tilting movement of the plate will be transmitted to this pinion and will impart a driving impulse thereto.

In Figure 5, I have further illustrated a spring 31, rigidly secured at its middle to the plate and having its free ends projecting across the lower ends of the slots 12. This spring serves to cushion the impact and absorb the shock when the ends of the slots are brought forcibly into engagement with the auxiliary axles at the time that tilting of the plate takes place. This spring can, of course, be employed in connection with the constructions shown in the other figures of the drawings, if desired.

Figure 5 further illustrates how ball or roller bearings can be interposed between the tilting plates and the main axle 2, if desired, in order to reduce friction.

While in the preceding figures I have described the plates as being tilted by actual drawbar pull, in Figure 6 I have shown a modified arrangement in which the shifting is done by the weight or inertia of the load itself. In this construction, the tilting plate is shown at 11' and the arm 14 thereof is connected by means of a helical spring 33 to a fixed point 34, on the vehicle frame, a turn buckle 35 being preferably interposed for adjusting the tension of the spring. As before, the weight of the load rests upon the auxiliary axles. In the construction as illustrated in Figures 6 and 7, however, these axles, instead of extending entirely across the vehicle, as shown in Figure 1, are simply in the nature of stub axles, and, as clearly shown at 4' and 5' in Figure 7, they extend only through the spring 6, and are rigidly secured thereto. Obviously, all that is necessary is to provide a stud or arm for terminating the weight of the load from the supporting spring to the tilting plate, and therefore, when the loads to be carried are not too heavy, mere stub axles, such as shown in Figure 7, will suffice. It will, of course, be understood that where, in the claims, I use the expression "auxiliary axles" I mean to include both complete axles as shown in Figure 1 and stub axles such as illustrated in Figure 7.

The tension of the spring 33 is so adjusted that it overcomes and balances the weight of the load, thus, normally holding the plate tilted at a slight angle with the auxiliary axle 4' resting in the bottom of one slot 12, and the auxiliary axle 5' floating in the other slot 12. Thus, the slot is carried at a point above and to one side of the main axle. When an obstruction is encountered, the inertia of the load results in tilting the plate still further and thus causing the weight of the load to assist in overcoming the obstacle.

As shown in Figure 8, where the vehicle moves in one direction only, a tilting plate 11ᵇ may be employed in which only a single slot 12 is provided, this slot working freely about one of the auxiliary axles such as 5 and lying on an arc struck from the other auxiliary axle 4 as a center.

In Figure 9, 36 designates the side frame of a freight car truck and 37 the bolster. The wheels and axles are omitted for the sake of clearness, but it will be understood that there is one wheel and axle at each side of the bolster. Adjacent each axle, a pair of stub shafts 4' and 5' are secured to the side frame 36' and the tilting plates are mounted on the main axle and are provided with arcuate slots working over the stub axles 4' and 5' as above described.

In order to aid in starting the load, each tilting plate such as 11 in Figure 10 may have a pair of pawls 29' and 30', pivotally mounted thereon and adapted to engage a ratchet drum 23, such as shown in Figure 3. The engagement of these pawls with the ratchet drum may be manually controlled as desired by means of a lever arm 38 carried by a rock shaft 39, and engaging the tails of the pawls. It will be clear that when the plate is tilted, due either to the inertia of the load or to drawbar pull, an impulse will be imparted to the drum 23 and associated wheel through which ever pawl 29' or 30' is in engagement therewith. These pawls are, of course, selectively engaged with the ratchet drum in accordance with the direction of travel of the car.

From the foregoing, it will be seen that my invention may be applied either to free wheel vehicles such as carts, to trailers having drawbars, to power driven vehicles such as trucks, and to railway vehicles in which the main axles are rigid with the wheels, or to any vehicle or the like that moves on wheels, as by the use of said mechanism every wheel becomes a pulled wheel, as the weight of the load and the driving effort are applied ahead of the axle.

What I claim is:—

1. Vehicle running gear comprising, in combination a main axle, a supporting spring and an auxiliary axle rigidly secured to said spring, a wheel on said main axle, and a plate tiltable about said main axle and having an arcuate slot through which said auxiliary axle extends.

2. Vehicle running gear comprising, in combination, a frame, a main axle, a wheel mounted thereon, an auxiliary axle secured to said frame, a plate tiltable about the main axle and having an arcuate slot through which said auxiliary axle extends, and means for tilting said plate until one end of said slot is freed from contact with said auxiliary axle.

3. Vehicle running gear, comprising in combination, a main axle, an auxiliary axle parallel therewith, a wheel on said main axle, an internally toothed ratchet drum rigid with said wheel, a plate tiltable about said main axle and having an arcuate slot through which said auxiliary axle extends, and a pawl pivotally mounted on said plate and controlling relative rotation of said plate and drum.

4. Vehicle running gear comprising, in combination an axle, a wheel thereon, an internally toothed drum centrally secured to said wheel, a plate concentrically tiltable on said axle and a pawl pivoted on said plate and controlling rotation of said drum relative to said plate.

5. Vehicle running gear comprising, in combination an axle, a wheel thereon, an internally toothed drum centrally secured to said wheel, a plate concentrically tiltable on said axle, a pawl pivoted on said plate, and manual means for governing the operation of said pawl.

6. Vehicle running gear comprising a main axle, a wheel on said axle, a pair of auxiliary axles disposed parallel with said main axle, a frame supported directly on said auxiliary axles, and a plate having a pivotal concentric connection with and tiltable about said main axle and slidably connected to said auxiliary axles.

7. Vehicle running gear comprising a main axle, a wheel on said axle, auxiliary axles disposed parallel with said main axle, a frame supported directly on said auxiliary axles, a plate pivotally connected to one of said auxiliary axles and concentrically pivotally connected to and tiltable about said main axle and bearing an arcuate slot through which the end of said other auxiliary axle extends, and draft operated means for tilting said plate.

8. Vehicle running gear comprising a main axle, a wheel on said axle, an auxiliary axle disposed parallel with and at one side of said main axle, a frame supported directly on said auxiliary axle, a plate having a pivotal connection with both axles, an internally toothed drum rigid with said wheel, a driving pinion meshing with said toothed drum, and a pawl carried by said plate and serving to control rotation of said drum relative to said plate.

In testimony whereof I affix my signature.

ALBERT AGRAMONTE.